(12) United States Patent
De et al.

(10) Patent No.: US 9,098,934 B2
(45) Date of Patent: Aug. 4, 2015

(54) AUGMENTED REALITY SYSTEM WITH CORRELATION AMONG MULTIPLE MARKERS

(71) Applicants: Anindya De, Chennai (IN); Ramprasath Venugopal, Chennai (IN)

(72) Inventors: Anindya De, Chennai (IN); Ramprasath Venugopal, Chennai (IN)

(73) Assignee: HCL Technologies Limited, Chennai, Tamil Nadu (IN)

( * ) Notice: Subject to any disclaimer, the term of this patent is extended or adjusted under 35 U.S.C. 154(b) by 68 days.

(21) Appl. No.: 13/928,398

(22) Filed: Jun. 27, 2013

(65) Prior Publication Data
US 2015/0002540 A1 Jan. 1, 2015

(51) Int. Cl.
*G06K 9/00* (2006.01)
*G06T 19/00* (2011.01)

(52) U.S. Cl.
CPC .................... *G06T 19/006* (2013.01)

(58) Field of Classification Search
USPC ........... 382/154, 106, 216, 282; 345/619, 633
See application file for complete search history.

(56) References Cited

U.S. PATENT DOCUMENTS

| | | | | |
|---|---|---|---|---|
| 7,301,547 B2* | 11/2007 | Martins et al. | ................. | 345/633 |
| 7,881,560 B2* | 2/2011 | John | ............................. | 382/287 |
| 8,243,099 B2* | 8/2012 | Ryu et al. | ...................... | 345/632 |
| 8,405,680 B1* | 3/2013 | Cardoso Lopes et al. | ..... | 345/633 |
| 8,483,424 B2* | 7/2013 | Kotake et al. | ................. | 382/100 |
| 8,542,250 B2* | 9/2013 | Baseley et al. | ................ | 345/633 |
| 8,644,551 B2* | 2/2014 | Hagbi et al. | .................. | 382/103 |
| 8,963,955 B2* | 2/2015 | Noge | ............................ | 345/633 |

* cited by examiner

*Primary Examiner* — Yosef Kassa
(74) *Attorney, Agent, or Firm* — Rahman LLC

(57) ABSTRACT

The embodiment discloses an improved Augmented Reality Multi Marker Positioning system that detects the distance and relative position of each marker, correlates the detected multiple markers and dynamically renders different objects for a single marker.

6 Claims, 9 Drawing Sheets

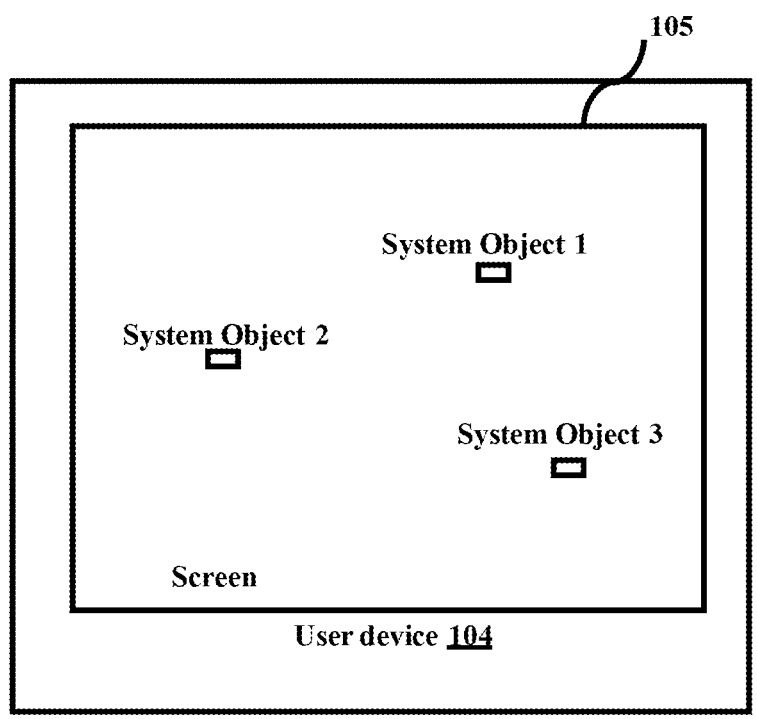

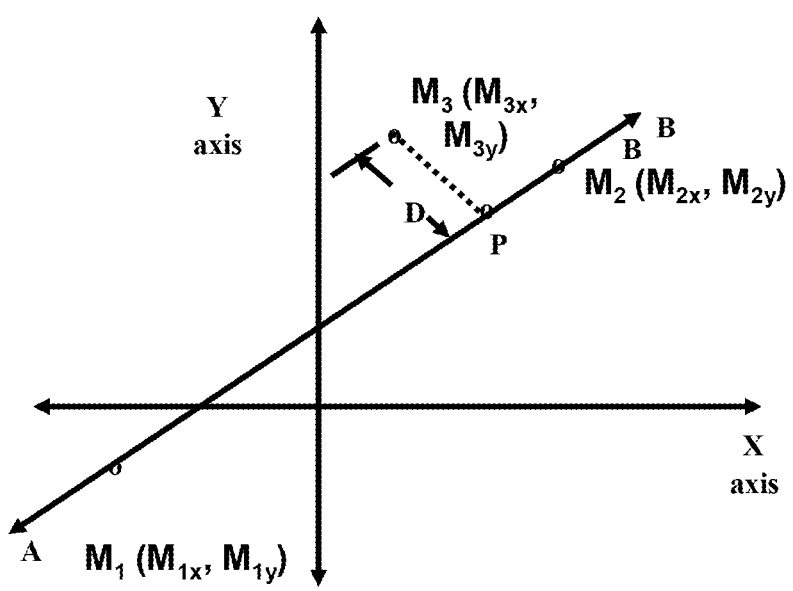

AUGMENTED REALITY SYSTEM WITH CORRELATION AMONG MULTIPLE MARKERS

PRIORITY DETAILS

The present application is based on, and claims priority from, Indian Application Number 2566/CHE/2012, filed on 28 Jun. 2012, the disclosure of which is hereby incorporated by reference herein.

TECHNICAL FIELD

The present embodiment relates to Augmented Reality (AR) systems and more particularly to Augmented Reality (AR) systems that enhance user experience by making systems more interactive.

BACKGROUND

Augmented Reality (AR) blurs the line between what's real and what's computer-generated by enhancing what users see, hear, feel and smell. There exist different techniques in which AR systems can be built like image overlay, superimposing real and virtual images, marker tracking, real object tracking etc.

Marker tracking techniques use a marker, which is an optically recognizable image or symbol and can be tracked using a live image capturing tool (such as a camera). The marker is visually recognized along with the position. Every marker is associated with a system generated image which is rendered on the marker position as seen through camera view. The system generated image can be moved by physically moving the marker, as long as the marker stays within the camera view. Existing technology uses marker tracking and recognition tools like AR Tool kit in creating marker based AR system. These toolkits can further render an associated system generated image (hence forth called system object) over the marker. But when multiple markers are used and are to be viewed at the same time, these toolkits can only render system objects against each marker, but are not able to make any correlation between the different system objects. Thus, user experience in applications like interactive learning, do-it-yourself instruction guides, games like jigsaw puzzle etc are not up to the desired level.

OBJECT OF EMBODIMENT

The object of the embodiments herein is to detect presence of multiple markers in AR systems at a given point in time and locate their position.

Another object of the embodiment is to determine relative positions of detected markers, calculate distance between detected markers and correlating them so as to dynamically render different objects for same marker on the screen.

SUMMARY

Disclosed herein is a method of rendering virtual objects in an augmented reality environment, the method comprising identifying a plurality of markers in the augmented reality environment; calculating distance and relative positions of each of the plurality of markers in the augmented reality environment; and rendering dynamically different virtual objects corresponding to each of the plurality of markers based on the calculated distance and relative positions of each of the plurality of markers.

Also, disclosed herein is a device for rendering virtual objects in an augmented reality environment, wherein the device comprising an integrated circuit further comprising at least one processor; at least one memory having a computer program code within the circuit; the at least one memory and the computer program code configured to with the at least one processor cause the device to identify a plurality of markers in the augmented reality environment; calculate distance and relative positions of each of the plurality of markers in the augmented reality environment; and render dynamically different virtual objects corresponding to each of the plurality of markers based on the calculated distance and relative positions of each of the plurality of markers.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

This embodiment is illustrated in the accompanying drawings, throughout which like reference letters indicate corresponding parts in the various figures. The embodiments herein will be better understood from the following description with reference to the drawings, in which.

DETAILED DESCRIPTION OF EMBODIMENTS

Figure 1:
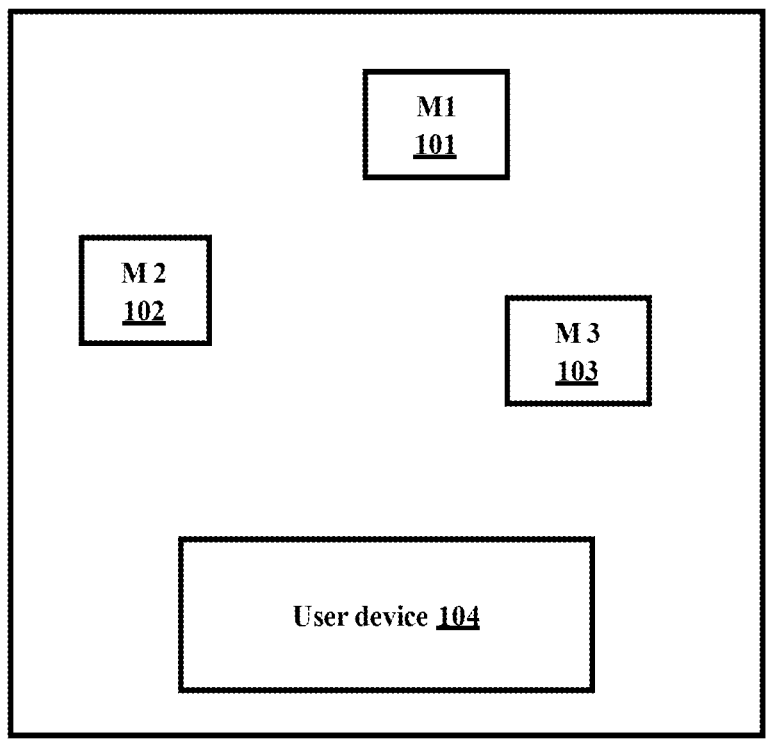
FIG. 1a depicts a user device having Augmented Reality Multi Marker Positioning System (ARMMPS), which can detect multiple markers and correlate them, according to the embodiments disclosed herein.
FIG. 1b depicts display screen of user device that can render system objects according to processed data of position matrices, according to the embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Referring now to the drawings, and more particularly to FIGS. 1 through 6, where similar reference characters denote corresponding features consistently throughout the figures, there are shown preferred embodiments.

FIG. 1a depicts a user device having Augmented Reality Multi Marker Positioning System (ARMMPS), which can detect multiple markers and correlate them (finds relative position of markers), according to the embodiments disclosed herein. Block diagram shows the user device 104 having the ARMMPS, which can detect and locate positions of real world multiple markers such as M1 101, M2 102, M3 103 and so on. The ARMMPS further creates position matrices for each marker positions; processes data of position matrices, then renders virtual system objects for detected multiple markers, as shown in FIG. 1b. The user device 104 can be a phone, a smart phone, tablet, computer, gaming equipment, laptop or any other device that can implement the ARMMPS.

The system comprises of marker detecting device (marker sensing device) such as optical sensors, live camera, still camera, infra red ray sensors, heat sensors, touch screens, proximity detectors. Markers can be two dimensional objects (2D) such as symbols, images, etc or three dimensional (3D) objects such as models, toys, fingers, faces, heat emitting, light emitting sources such as LED's etc. In one embodiment, the user can define his own marker.

FIG. 1b depicts the display screen 105 of the user device 104 which is implementing ARMMPS, according to the embodiments disclosed herein. Figure shows system objects1, system object2, system object3 rendered by the ARMMPS for markers M1 101, M2 102 and M3 103 respectively. System objects rendered can be in 2D or 3D, which can be accessed from sources like system memory, pen drives, DVD's or any storage devices. In one embodiment user can choose or customize the object to be rendered for a marker. In one embodiment ARMMPS can render a predefined system object or a series of objects when it detects multiple markers satisfying a predefined condition.

Figure 2:
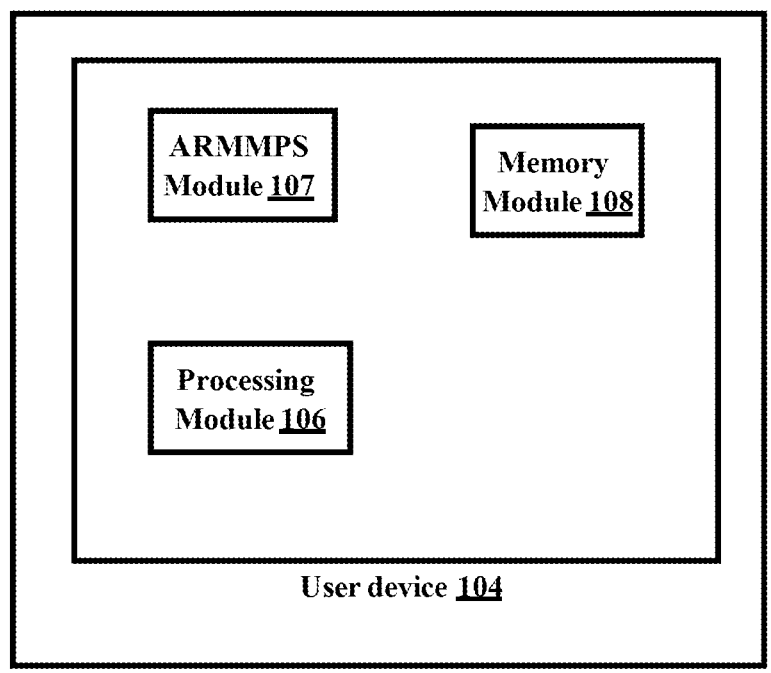
FIG. 2 depicts user device modules, according to embodiments as disclosed herein.

FIG. 2 Depicts modules enclosed in the user device 104, according to embodiments as disclosed herein. The user device has an ARMMPS Module 107, Memory module 108, processing module 109. ARMMPS module is the one which carries out the function of identifying multiple markers present in the augmented reality environment, generating positions matrices for each marker, calculating distance and relative positions of each marker and correlating markers. Memory module will store various data like system objects.

Figure 3:
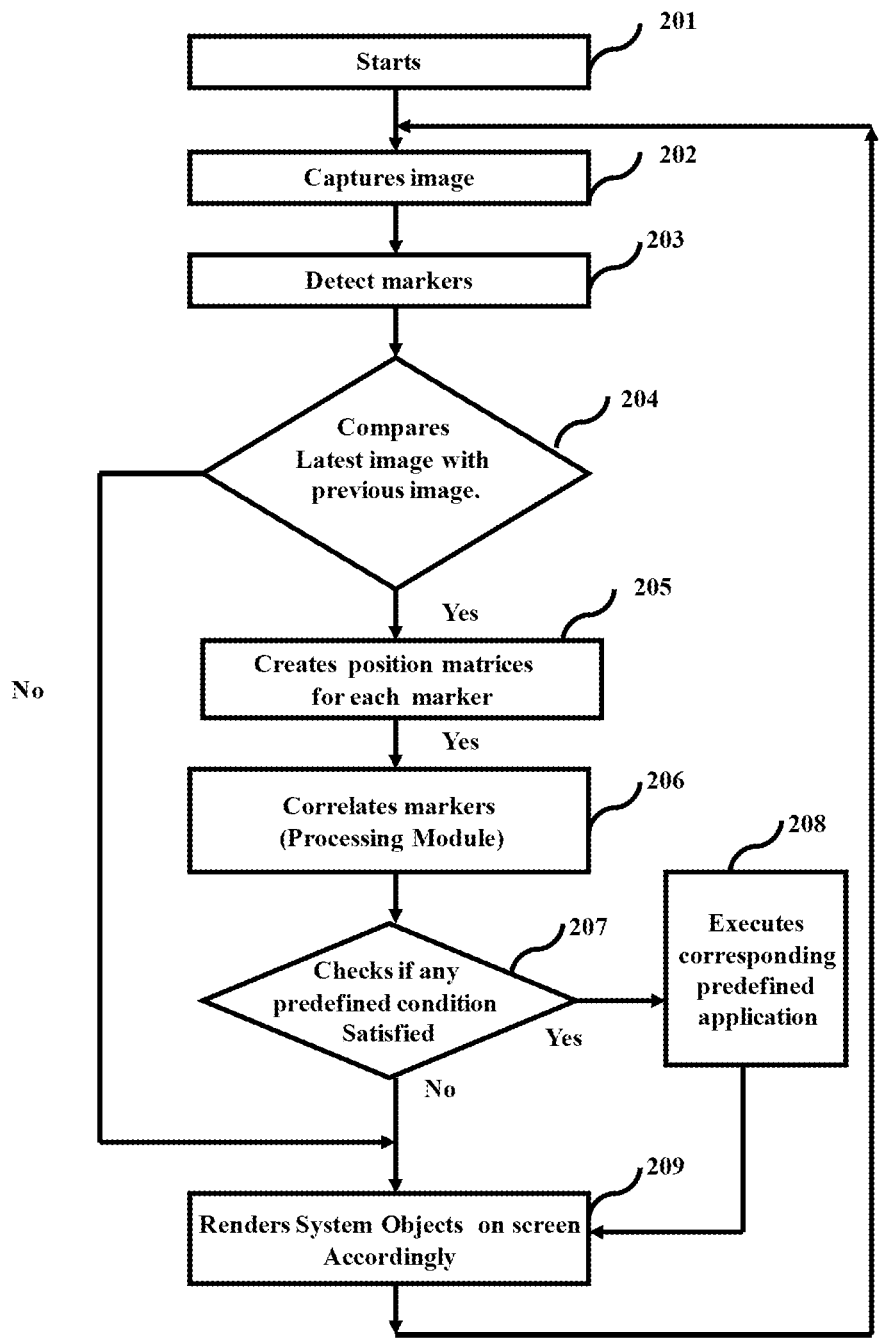
FIG. 3 depicts flow diagram of ARMMPS, according to embodiments as disclosed herein.

FIG. 3 depicts a flow diagram of the process followed by the ARMMPS, according to embodiments as disclosed herein. The ARMMPS module 107 captures real world images using live camera, process it to detect multiple markers and renders system objects for multiple markers detected.

The ARMMPS starts (301) execution by initializing and there after captures (302) image in which markers may be present. The ARMMPS module further analyzes (303) this image to detect markers present. The ARMMPS module compares (304) the latest image with the previous image and if a change has happened, then it creates (305) position matrices for each marker in the latest image and calculates (306) distance and relative positions of each marker and correlates markers. ARMMPS module uses the standard AR marker recognition tools (like AR toolkit, QCAR etc) to detect marker and get position matrix for each marker. This position matrix provides target area on the screen where the system object associated with the marker can displayed.

Details of processing module are discussed later in FIG. 4. Using this correlated data of markers, ARMMPS module checks if any predefined condition is satisfied (307), if so it executes corresponding predefined application (308) and renders system objects accordingly (309). If predefined condition is not satisfied, it renders system objects accordingly (309) for respective markers detected that can be displayed on user device 104 screen. This flow loops back for every predefined time period or continuously or by triggering of predefined condition, examples of such predefined conditions are change in marker position or entering of new marker or change in user actions.

The various actions in method 300 may be performed in the order presented, in a different order or simultaneously. Further, in some embodiments, some actions listed in FIG. 3 may be omitted.

Figure 4:
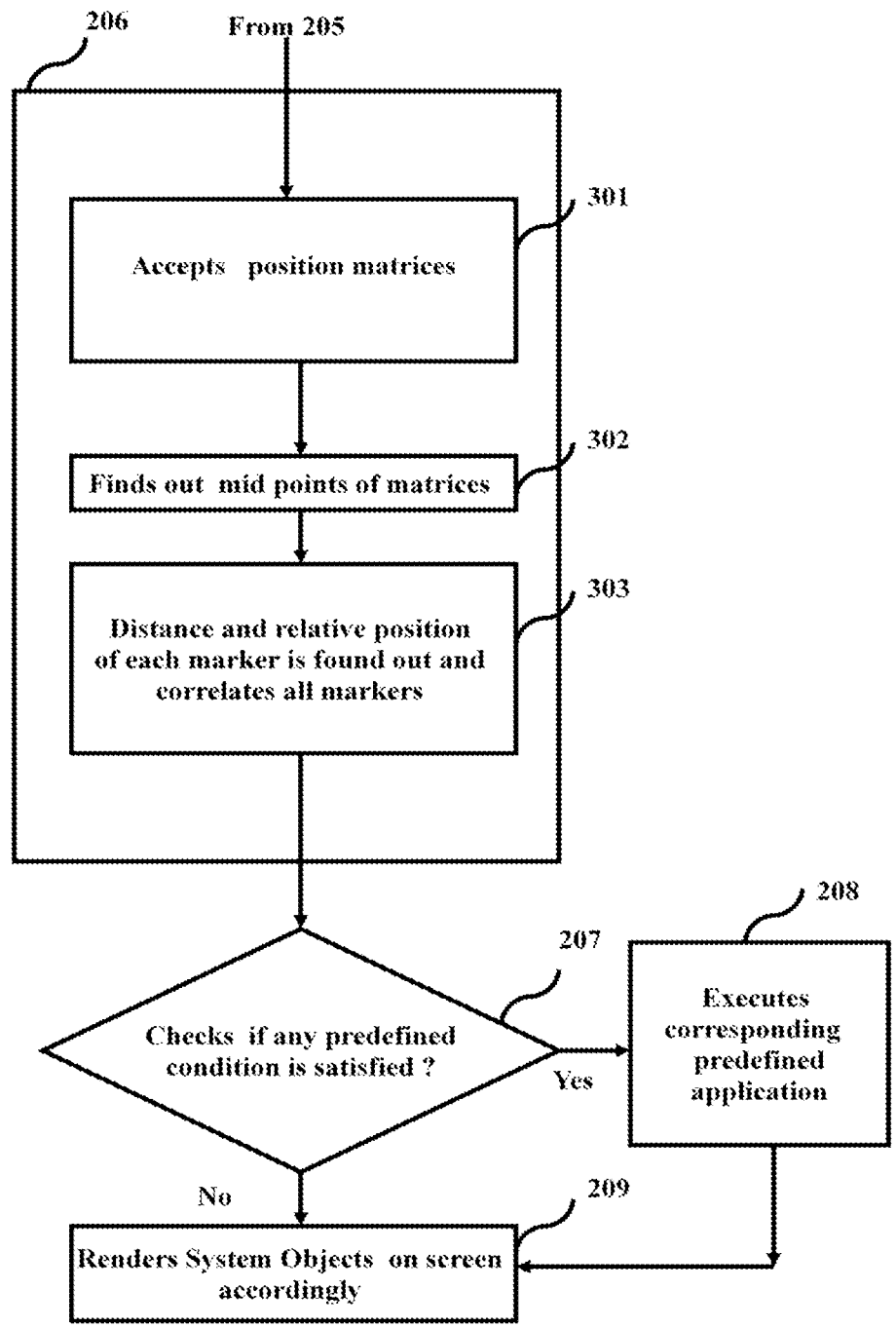
FIG. 4 depicts flow diagram of processing module of ARMMPS, according to embodiments as disclosed herein.

FIG. 4 depicts a flow diagram of the process followed by the processing module 109 which is part of ARMMPS, according to embodiments as disclosed herein. Processing module 109 correlates all markers by using techniques disclosed in this embodiment. Position matrix gives target area on the screen where the system object associated with the marker can be displayed, this position matrix are generated by standard AR marker recognition tools (like AR toolkit, QCAR etc). Processing module 109 accepts (401) position matrices, finds (402) out mid-point of the position matrices, using which distance and relative position of each marker is found out and correlates (403) all markers. Using this correlated data of markers, ARMMPS module checks if any predefined condition is satisfied, if so it executes corresponding predefined application and renders system objects on screen accordingly. If predefined condition is not satisfied, it renders system objects for respective markers detected that can be displayed in user device 104 screen.

The various actions in method 400 may be performed in the order presented, in a different order or simultaneously. Further, in some embodiments, some actions listed in FIG. 4 may be omitted.

Figure 5:
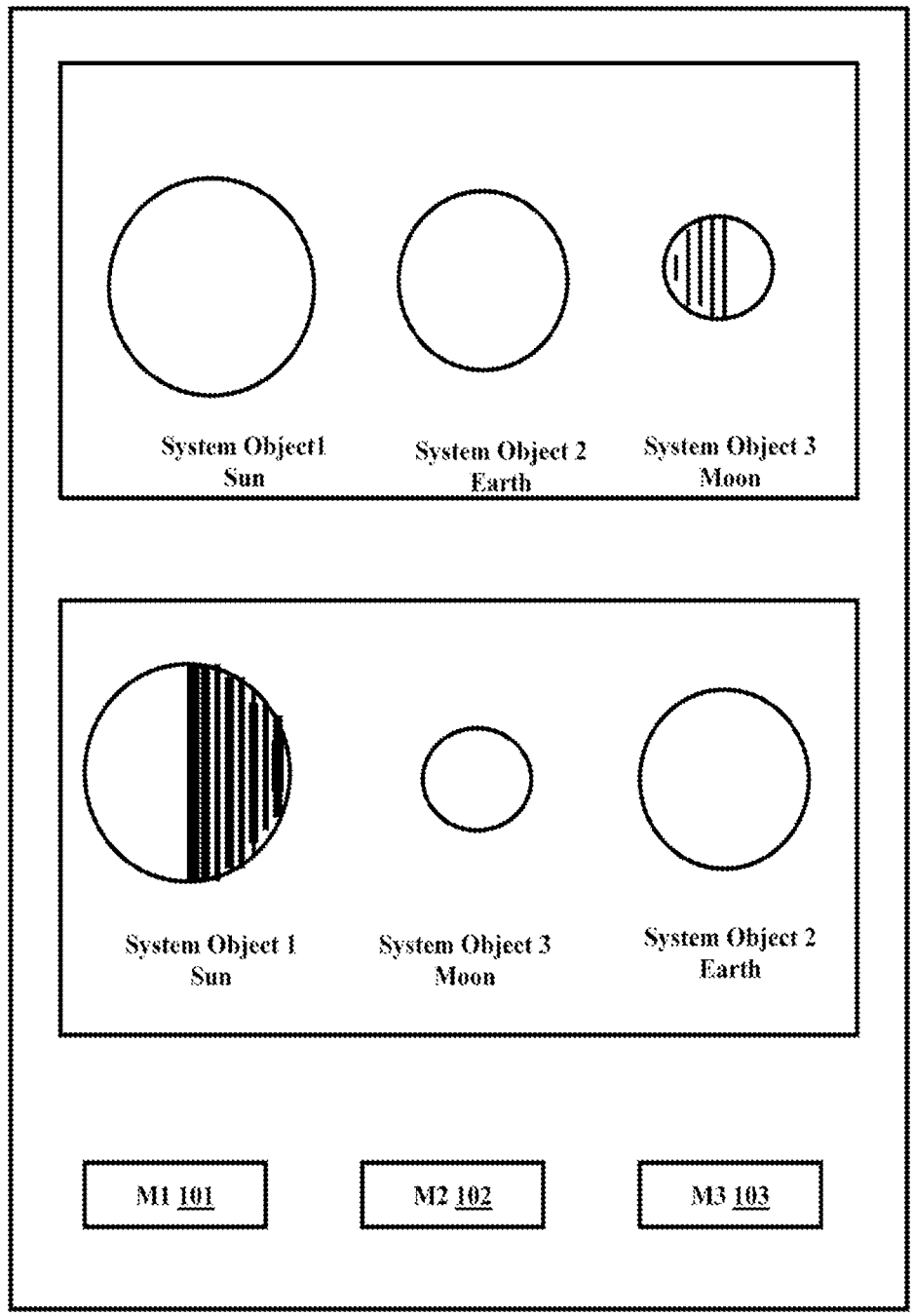
FIG. 5 depicts illustrative embodiment of ARMMPS.

FIG. 5 depicts example embodiment of ARMMPS according to embodiment disclosed herein, example discloses interactive learning module for children. In this example system uses live camera to capture images, these images are processed and markers M1 101, M2 102, M3 103 are identified. User has chosen to render sun for marker M1 101, earth for marker M2 102, moon for marker M3 103. User can move these markers within view of live camera which is capturing images. ARMMPS will use the images continuously captured by camera, identify markers, locate them, create respective position matrices, calculates the distance and relative positions of each marker. The sun, earth, moon are rendered according to their respective marker positions.

The ARMMPS also correlates the position of each marker and if predefined conditions like solar eclipse, lunar eclipse are detected then, the ARMMPS will dynamically render different object to same marker. In this case a solar eclipse has happened when a moon has come in middle of sun and earth then the ARMMPS rendered a different object which is a sun with shade for marker M1 dynamically.

Figure 6:
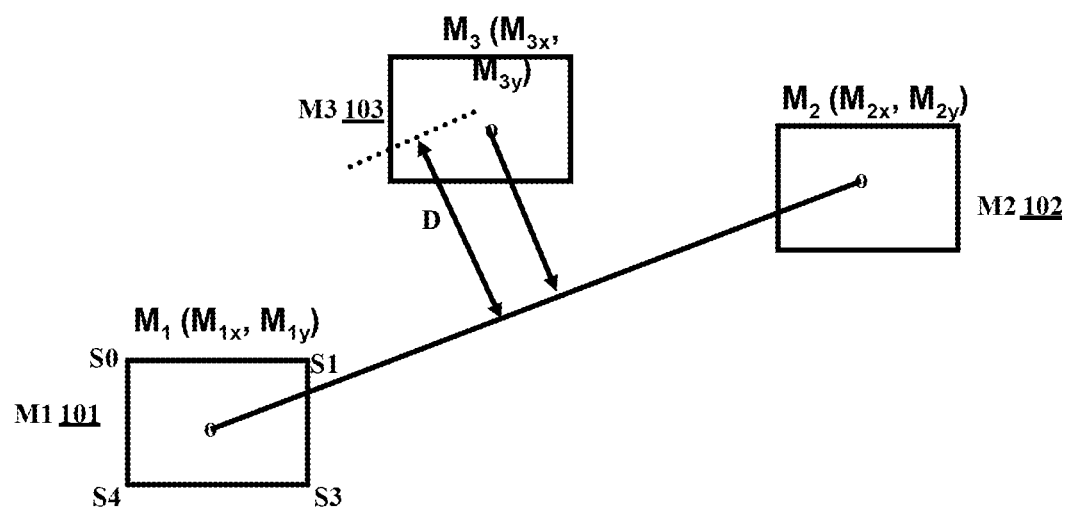
FIG. 6a, FIG. 6b and FIG. 6c depict techniques used by processing module to correlate multiple markers used in illustrative example of FIG. 4, according to embodiments as disclosed herein.
Figure 6C:
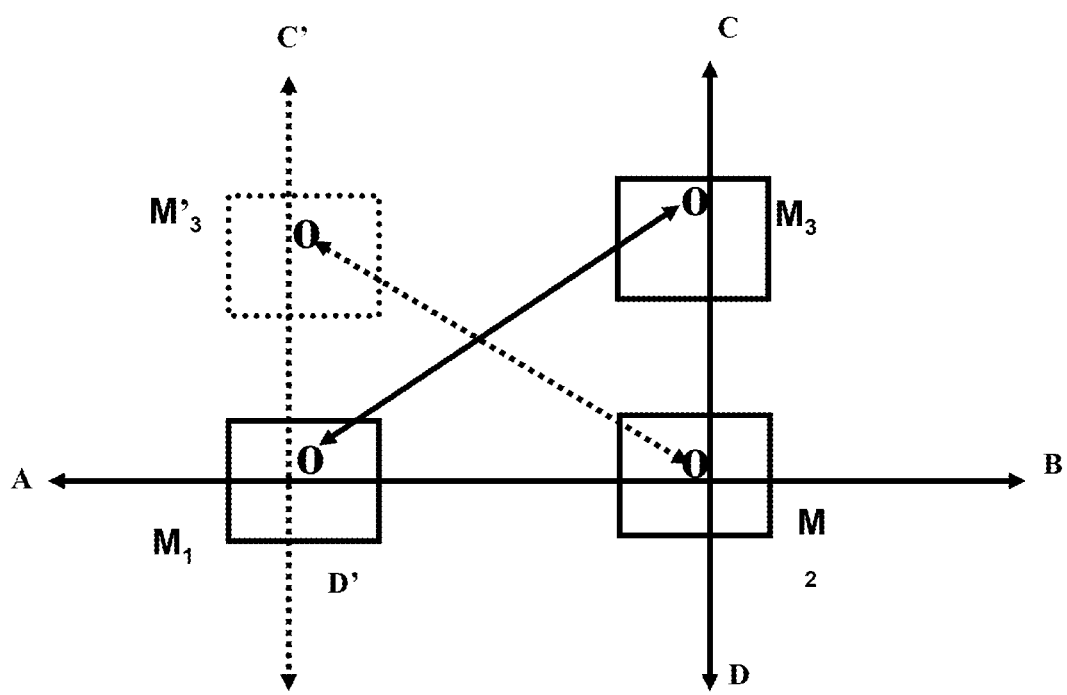

FIG. 6a, FIG. 6b and FIG. 6c depicts techniques used by processing module to correlate multiple markers used for illustrative example of FIG. 5, according to embodiments as disclosed herein. Techniques in this illustrative example use mathematical tools to calculate distances and relative position of marker with respect to each other.

FIG. 6a shows Illustrative example that considers position matrices which define target area on screen (where system object associated with marker is displayed). Target areas for markers here are the quadrilaterals as shown in FIG. 6a. Square represented by S0, S1, S2, and S3 represents marker M1 (101). Position of a marker is the mid-point of the target area. Midpoint of target area of M1 (101) is given by $$M1(M1x,M1y)=(S0.x+S1.x+S2.x+S3.x)/4,(S0.y+S1.y+S2.y+S3.y)/4$$

Similarly midpoint of target area of markers M2 (102) and M3 (103) can be calculated, and can be given by M2 (M2x, M2y), M3 (M3x, M3y) respectively.

FIG. 6b shows technique to check if all markers fall in a line. Technique used, initially considers M1 (M1x, M1y) and M2 (M2x, M2y) representing midpoints of target areas of M1 (101) and M2 (102) as seen in FIG. 6b, then relative position of midpoint of target area M3 (M3x, M3y) of marker M3 (103) from these two midpoints is calculated. Line equations and perpendicular distances are used here. Various mathematical tools and techniques available can be used to get line equations and perpendicular distances. Illustrative example here follows below mentioned steps. Technique finds equation of straight line that passes through the points M1 (M1x, M1y) and M2 (M2x, M2y) by using general straight line equation:

$$y=m*x+c,$$

Where m=(M1y−M2y)/(M1x−M2x) and then rearranges above line equation as A*x+B*y+C=0

Calculates perpendicular distance (D) from point M3 (M3x, M3y) to line AB represented by equation A*x+B*y+C=0 which passes through M1 (M1x, M1y) and M2 (M2x, M2y). D gives perpendicular distance of M3 (M3x, M3y) from line AB passing through M1 (M1x, M1y) and M2 (M2x, M2y). With this available data, technique used here can further check if M3 (M3x, M3y) falls on the same line as M1 (M1x, M1y) and M1 (M1x, M1y) as described below.

Two consecutive corners of square target area of marker M1 (101) are S1 and S2

Length of one side of square S0, S1, S2, S3 (length)=
$$\sqrt{(S_1.x-S_2.x)^2+(S_1.y-S_2.y)^2}$$

Lengths of all sides of all target areas for all markers are equal as target area in illustrative example is a square.

Half of the length of a side of M3's (103) target area (d')=length/2;

If D<d' (less than) then we can say that M3's (103) target area position falls on the same line of M1 (M1x, M1y) and M2 (M2x, M2y).

FIG. 6c shows technique to check if one marker falls between the other two, according to the embodiments disclosed herein.

Here case where third midpoint M3 (M3x, M3y) can have various locations is illustrated. Two different positions M3 (M3x, M3y) or M3' (M3'x, M3'y) that can be taken are considered. Technique calculates various distances between marker midpoints as mentioned below DM1M2=distance between M1 (M1x, M1y) and M2 (M2x, M2y)

DM1M3=distance between M1 (M1x, M1y) and M3 (M3x, M3y)

DM2M3=distance between M2 (M2x, M2y) and M3 (M3x, M3y)

DM2M3'=distance between M2 (M2x, M2y) and M3' (M3'x, M3'y)

Now checks if following condition is satisfied.

$$DM1M3^2<=DM2M3^2+DM1M2^2$$

Or $$DM2M3'^2<=DM1M3'^2+DM1M2^2$$

Using this condition it can be decided if M3 (M3x, M3y) or M3' (M3'x, M3'y) falls in the position in-between M1 (M1x, M1y) and M2 (M2x, M2y), and neither lies on the right side of the CD line nor the left side of the C'D' line.

The embodiments disclosed herein can be implemented through at least one software program running on at least one hardware device and performing network management functions to control the elements. The elements shown in FIGS. 1, 2, 3, 4, 5 and 6, include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method of rendering virtual objects in an augmented reality environment, said method comprising:
    identifying a plurality of markers in said augmented reality environment;
    calculating distance and relative positions of each of said plurality of markers in said augmented reality environment;
    rendering dynamically different virtual objects corresponding to each of said plurality of markers based on said calculated distance and relative positions of each of said plurality of markers;
    calculating distance and relative by finding midpoints of each of said plurality of markers; and
    finding line equation connecting said mid points.

2. The method according to claim 1, wherein rendering said dynamically different virtual object is based on at least one predefined condition.

3. The method, according to claim 1, wherein said identification of markers is based on at least one of image, video, sensor, identification string, bar code, actuator, infrared ray or Near Field Communication (NFC).

4. A device for rendering virtual objects in an augmented reality environment, wherein said device comprising:
    an integrated circuit further comprising at least one processor;
    at least one memory having a computer program code within said circuit;
    said at least one memory and said computer program code configured to with said at least one processor cause the device to:
        identify a plurality of markers in said augmented reality environment;
        calculate distance and relative positions of each of said plurality of markers in said augmented reality environment;
        render dynamically different virtual objects corresponding to each of said plurality of markers based on said calculated distance and relative positions of each of said plurality of markers;
        calculate distance and relative positions by finding midpoints of each of said plurality of markers; and
        finding line equation connecting said mid points.

5. The device, according to claim 4, wherein said device is further configured to render said dynamically different virtual object based on at least one predefined condition.

6. The device, according to claim 4, wherein said device is further configured to identify markers based on at least one of image, video, sensor, identification string, bar code, actuator, infrared ray or Near Field Communication (NFC).

* * * * *